US011400913B2

(12) United States Patent
Blue et al.

(10) Patent No.: US 11,400,913 B2
(45) Date of Patent: Aug. 2, 2022

(54) METHOD AND SYSTEM FOR STARTING AN ENGINE

(71) Applicant: Ford Global Technologies, LLC, Dearborn, MI (US)

(72) Inventors: Corey James Blue, Belleville, MI (US); Scott James Thompson, Canton, MI (US); Kendrick Morrison, Wayne, MI (US); Scott Patrick Ries, South Lyon, MI (US); Steve Michael Cicala, Dearborn Heights, MI (US); Kurt Howard Nickerson, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 214 days.

(21) Appl. No.: 16/599,005

(22) Filed: Oct. 10, 2019

(65) Prior Publication Data

US 2021/0107444 A1 Apr. 15, 2021

(51) Int. Cl.
*B60W 10/06* (2006.01)
*B60W 10/10* (2012.01)
*B60W 10/02* (2006.01)

(52) U.S. Cl.
CPC ............ *B60W 10/06* (2013.01); *B60W 10/02* (2013.01); *B60W 10/10* (2013.01)

(58) Field of Classification Search
CPC ...... B60W 10/06; B60W 10/10; B60W 30/19; B60W 2510/0638; B60W 2510/1015; B60W 2710/1005; B60W 2710/021
See application file for complete search history.

(56) References Cited

U.S. PATENT DOCUMENTS

| | | | | |
|---|---|---|---|---|
| 7,090,615 B2* | 8/2006 | Matsumura | ........... | B60W 10/02 477/78 |
| 8,292,780 B2* | 10/2012 | Jerwick | ............... | F16H 61/0403 477/5 |
| 8,321,103 B2* | 11/2012 | Sakaue | ................. | B60W 10/02 701/54 |
| 9,656,664 B2* | 5/2017 | Ando | .................... | B60W 10/10 |

* cited by examiner

*Primary Examiner* — Huan Le
(74) *Attorney, Agent, or Firm* — David Kelley; McCoy Russell LLP (57) ABSTRACT

A method and system for operating a vehicle that includes a driveline disconnect clutch and a step-ratio transmission is described. In one example, the method includes shifting the step-ratio transmission to neutral and accelerating an engine to an expected input shaft speed of the step-ratio transmission via applying full output capacity of an electric machine to the engine.

20 Claims, 5 Drawing Sheets

METHOD AND SYSTEM FOR STARTING AN ENGINE

FIELD

The present description relates to methods and a system for operating a vehicle that includes a driveline disconnect clutch and an integrated starter/generator. The methods and systems may reduce engine starting time during some conditions.

BACKGROUND AND SUMMARY

A vehicle may include an engine, a driveline disconnect clutch, and a driveline integrated starter/generator. In one example, the driveline disconnect clutch may be positioned in a driveline between the engine and the integrated starter/generator. The driveline disconnect clutch may be open when driver demand is low. The integrated starter/generator may provide force to propel the vehicle when driver demand is low and the engine may be stopped (e.g., not combusting fuel and not rotating) when driver demand is low. The engine and the integrated starter/generator may be coupled together via the driveline disconnect clutch when driver demand is at higher levels. The engine may be started via closing the driveline disconnect clutch and rotating the engine via torque provided by the integrated starter/generator. Because the integrated starter/generator may propel the vehicle while providing torque to start the engine, the integrated starter/generator may take a greater amount of time than may be desired to accelerate the engine to cranking speed. In addition, vehicle torque response may be less than may be expected when the engine is being started via the integrated starter/generator since the integrated starter/generator may be operating close to, or at its power output capacity, during engine starting.

The inventors herein have recognized the above-mentioned issues and have developed a vehicle operating method, comprising: stopping rotation of an engine via a controller in response to vehicle operating conditions; and in response to request for a power-on downshift of a transmission, shifting the transmission to neutral and rotating the engine via an integrated starter/generator to an expected input shaft speed of the transmission, the expected input shaft speed of the transmission occurring immediately after the power-on downshift of the transmission.

By shifting a transmission into neutral and rotating an engine via an integrated starter/generator to an expected input shaft speed of the transmission, it may be possible to provide the technical result of reducing engine starting time and an amount of time to switch between driveline operating modes. In particular, shifting the transmission to neutral allows the integrated starter generator to accelerate the engine using the full power output capacity of the integrated starter/generator, or a suitable percentage of the full power output capacity of the integrated starter/generator, so that it takes less time for the engine to reach a speed of the driveline so that engine power may be delivered to the driveline sooner. The transmission may complete the gear shift after engine speed reaches or exceeds an expected input shaft speed of the transmission so that the possibility of the transmission gear shift generating a driveline torque disturbance may be reduced.

The present description may provide several advantages. Specifically, the approach may reduce engine starting time. The approach may also improve vehicle drivability via reducing a possibility of driveline torque disturbances. In addition, the approach may improve driveline torque response.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
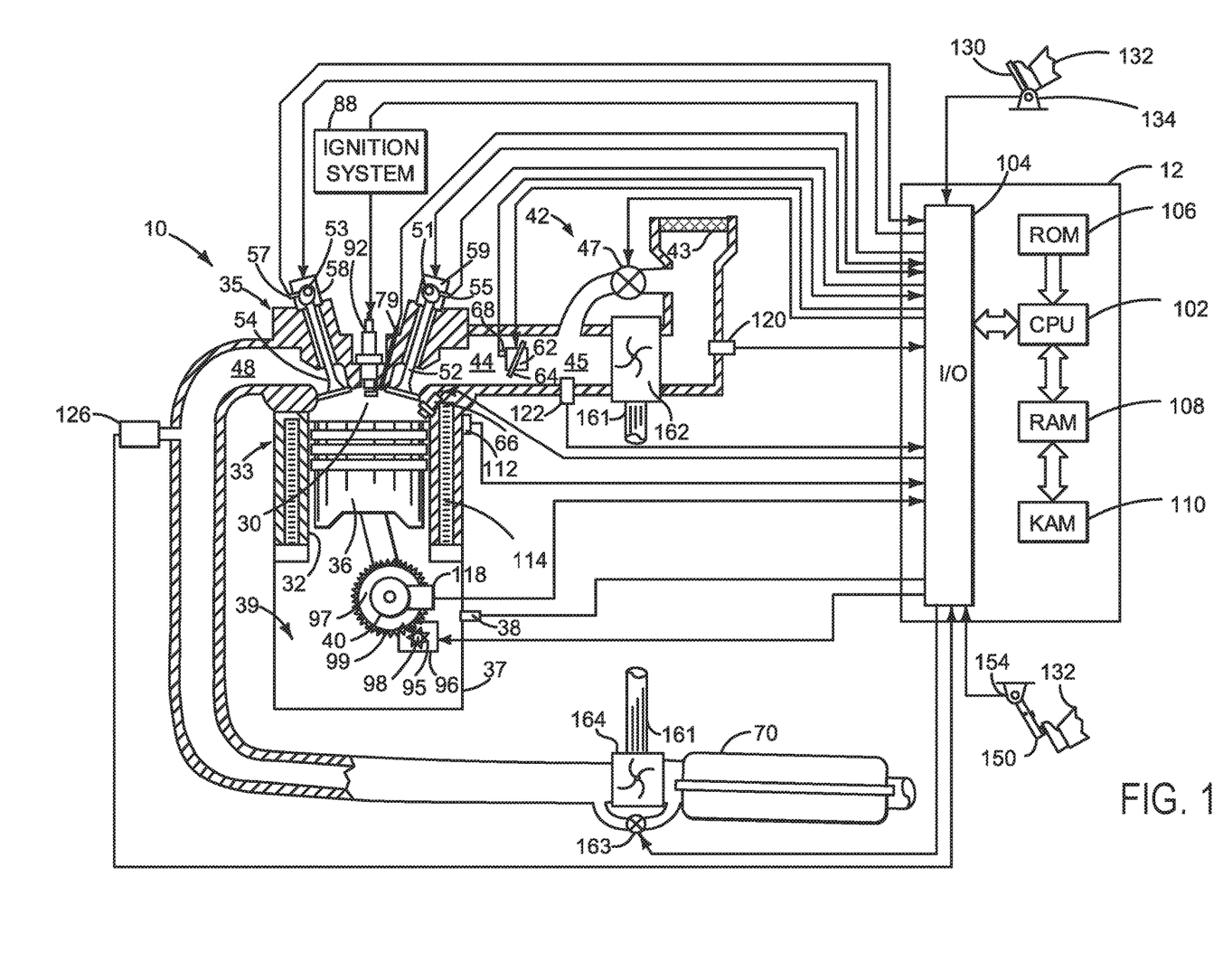
FIG. 1 shows a schematic diagram of an internal combustion engine.
Figure 2:
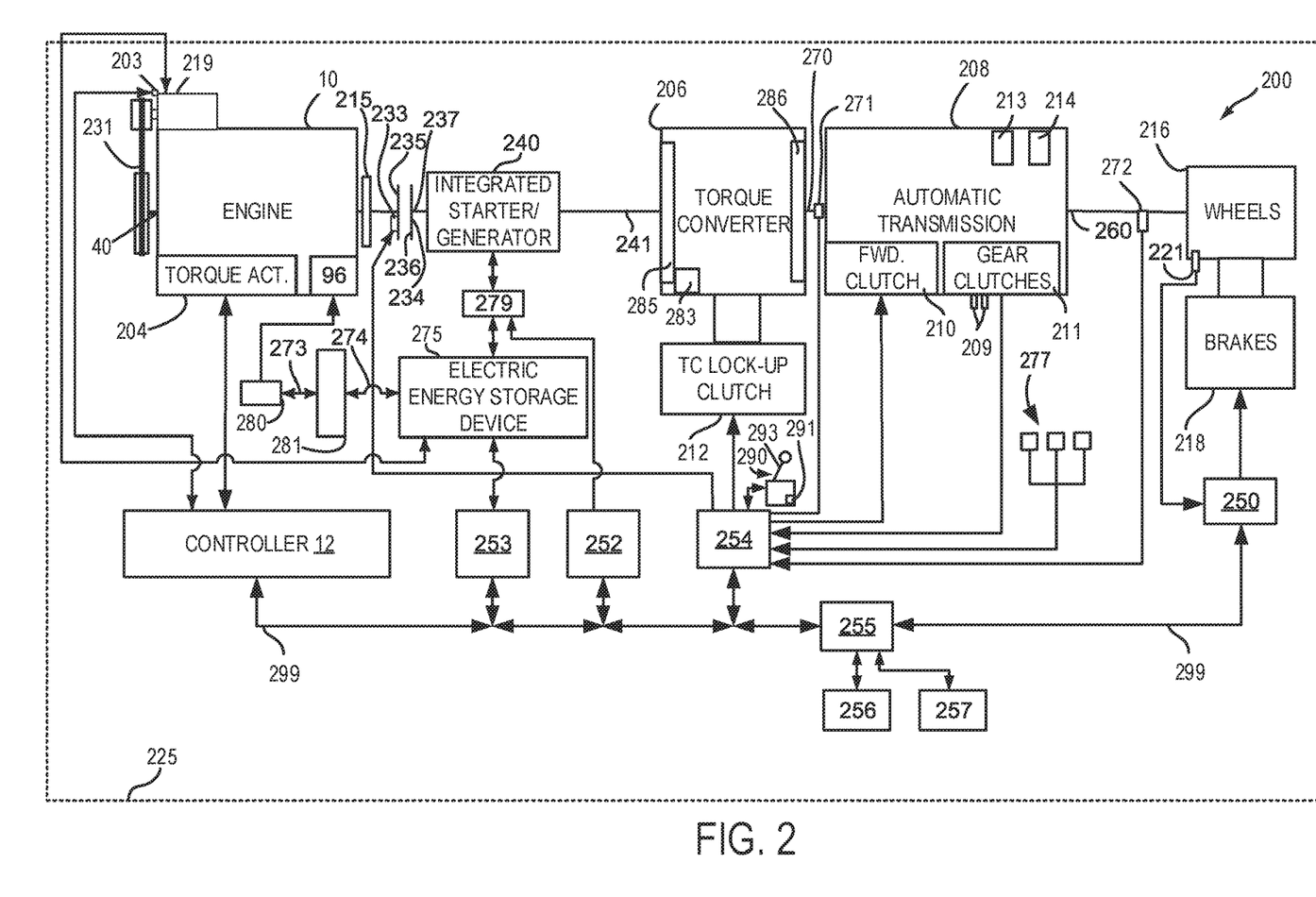
FIG. 2 shows a schematic diagram of an example vehicle driveline or powertrain including the internal combustion engine shown in FIG. 1.
Figure 3:
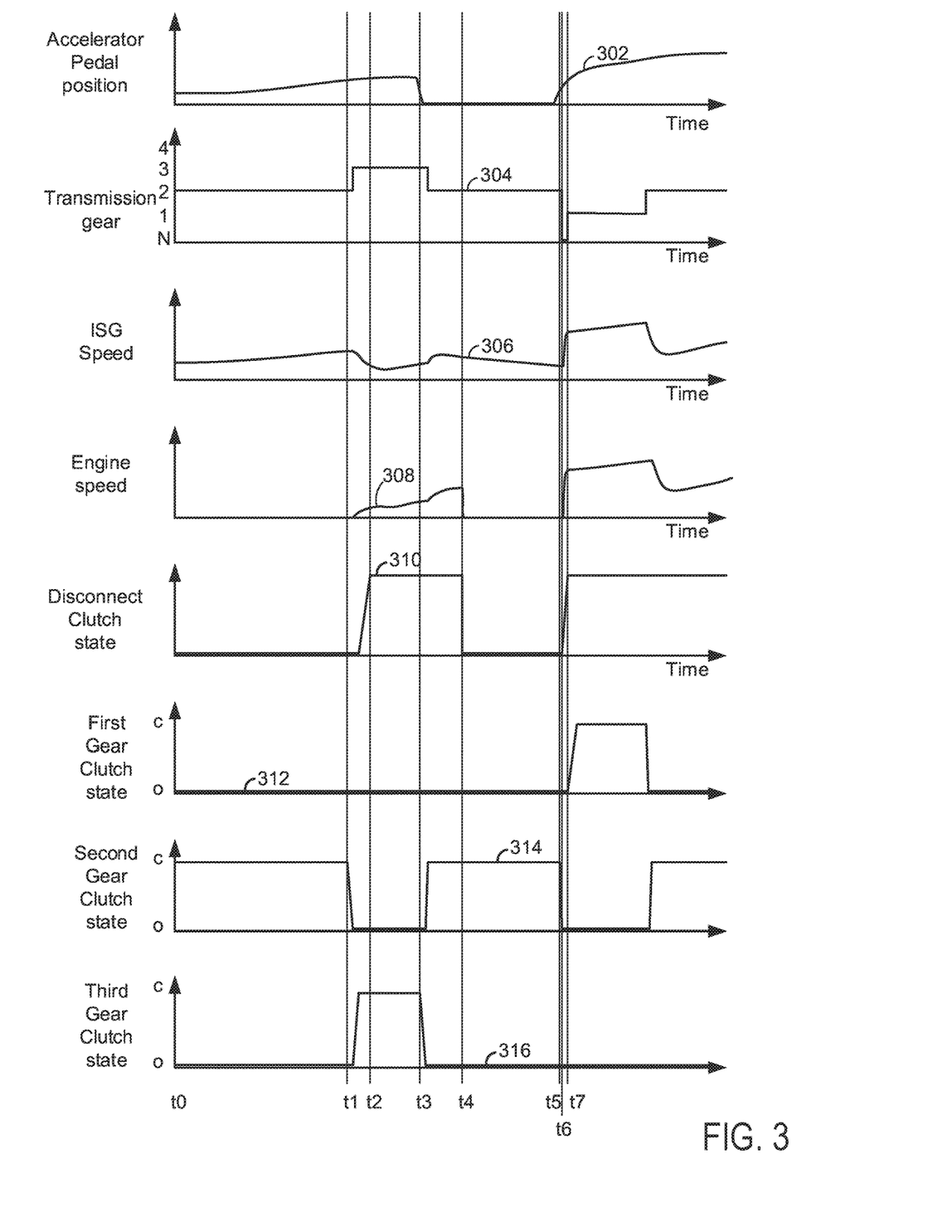
FIG. 3 shows a prophetic driveline operating sequence.
Figure 4:
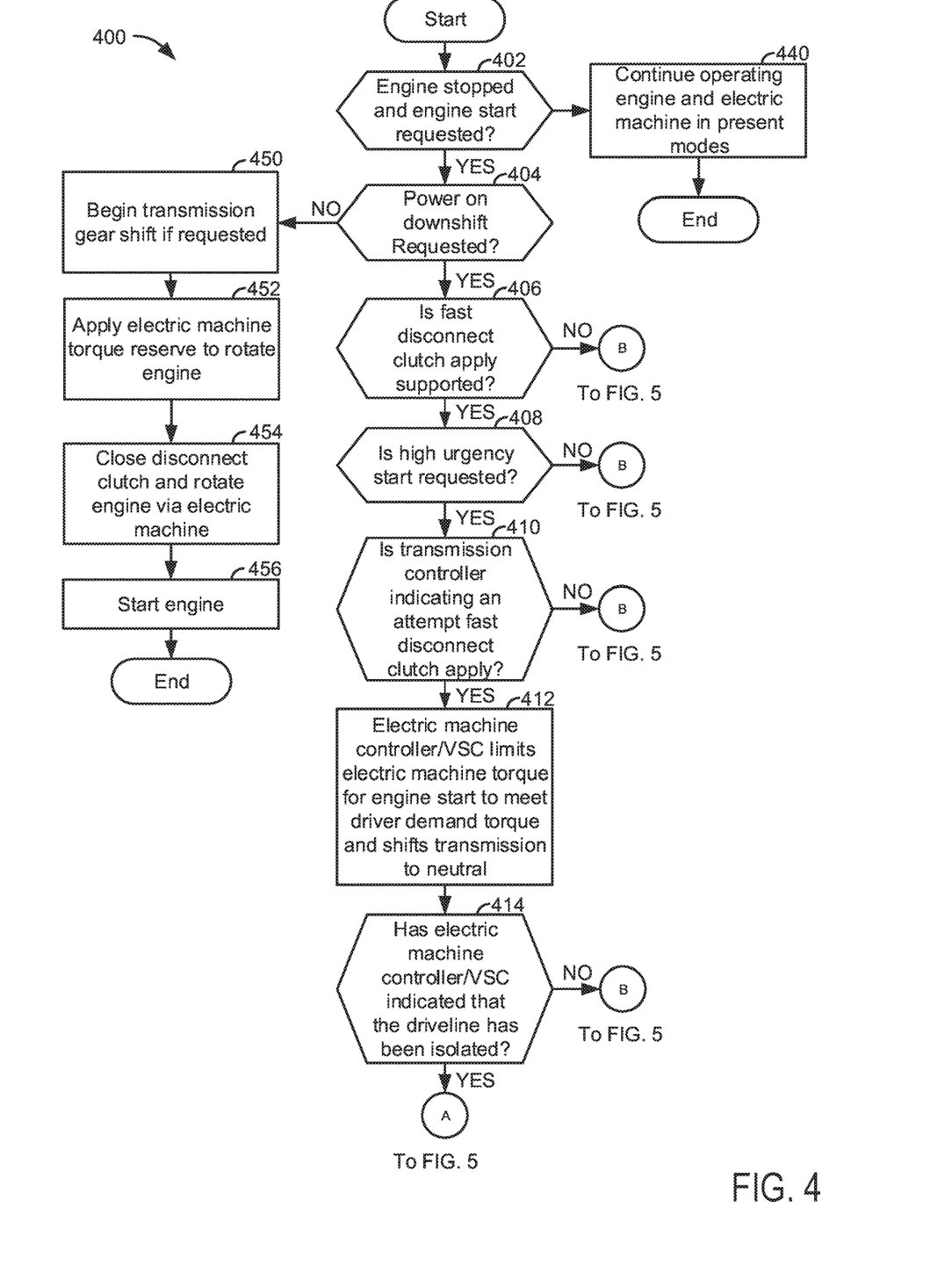
FIGS. 4 and 5 show an example method for operating a driveline.
Figure 5:
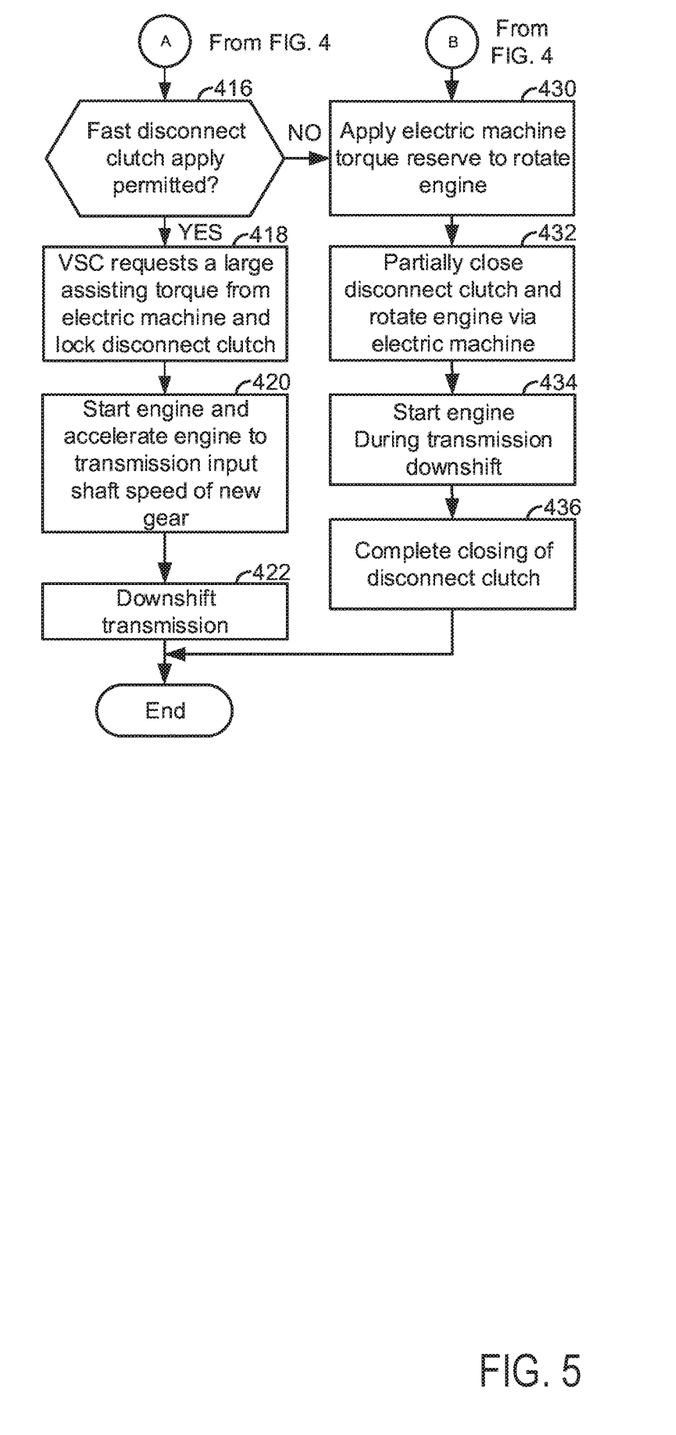

The present description is related to operating a driveline that has a disconnect clutch and an integrated starter/generator. Torque or power response of the driveline may be improved for larger changes in requested driveline torque or power. FIG. 1 shows an example engine that may be started when driver demand torque or power exceeds a threshold level so that the driver demand torque or power may be met. The engine of FIG. 1 may be included in a driveline as shown in FIG. 2. The engine of FIG. 1 and the driveline of FIG. 2 may be operated as shown in the sequence of FIG. 3. A method for operating the engine and the driveline of FIGS. 1 and 2 is shown in FIGS. 4 and 5.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. A phase or position of intake valve 52 may be adjusted relative to a position of crankshaft 40 via valve phase changing device 59. A phase or position of exhaust valve 54 may be adjusted relative to a position of crankshaft 40 via valve phase changing device 58. Valve phase changing devices 58 and 59 may be electro-mechanical devices, hydraulic devices, or mechanical devices.

Engine 10 includes a crankcase 39 that houses crankshaft 40. Oil pan 37 may form a lower boundary of crankcase 39 and engine block 33 and piston 36 may constitute an upper boundary of crankcase 39. Crankcase 39 may include a crankcase ventilation valve (not shown) that may vent gases to combustion chamber 30 via intake manifold 44. Pressure in crankcase 39 may be sensed via pressure sensor 38. Alternatively, pressure in crankcase 39 may be estimated.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human foot 132; a position sensor 154 coupled to brake pedal 150 for sensing force applied by human foot 152; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; cylinder pressure from pressure sensor 79; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 212, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation.

Vehicle controller 255 and/or engine controller 12 may also receive input from human/machine interface 256 and traffic conditions (e.g., traffic signal status, distance to objects, etc.) from sensors 257 (e.g., cameras, LIDAR, RADAR, etc.). In one example, human/machine interface 256 may be a touch input display panel. Alternatively, human/machine interface 256 may be a key switch or other known type of human/machine interface. Human/machine interface 256 may receive requests from a user. For example, a user may request an engine stop or start via human/machine interface 256. Additionally, human/machine interface 256 may display status messages and engine data that may be received from controller 255.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via BISG 219, or via driveline integrated starter/generator (ISG) 240 also known as an integrated starter/generator. A speed of BISG 219 may be determined via optional BISG speed sensor 203. Driveline ISG 240 (e.g., high voltage (operated with greater than 30 volts) electrical machine) may also be referred to as an electric machine, motor, and/or generator. Further, power of engine 10 may be adjusted via torque actuator 204, such as a fuel injector, throttle, etc.

BISG 219 is mechanically coupled to engine 10 via belt 231. BISG 219 may be coupled to crankshaft 40 or a camshaft (e.g., 51 or 53 of FIG. 1). BISG 219 may operate as a motor when supplied with electrical power via electric energy storage device 275 or low voltage battery 280. BISG 219 may operate as a generator supplying electrical power to electric energy storage device 275 or low voltage battery 280. Bi-directional DC/DC converter 281 may transfer electrical energy from a high voltage buss 274 to a low voltage buss 273 or vice-versa. Low voltage battery 280 is electrically coupled to low voltage buss 273. Electric energy storage device 275 is electrically coupled to high voltage buss 274. Low voltage battery 280 may selectively supply electrical energy to starter motor 96.

An engine output power may be transmitted to a first or upstream side of powertrain disconnect clutch 235 through dual mass flywheel 215. Disconnect clutch 236 is hydraulically actuated and hydraulic pressure within driveline disconnect clutch 236 (driveline disconnect clutch pressure) may be adjusted via electrically operated valve 233. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 275 in a regeneration mode. ISG 240 is in electrical communication with energy storage device 275 via inverter 279. Inverter 279 may convert direct current (DC) electric power from electric energy storage device 275 into alternating current (AC) electric power for operating ISG 240. Alternatively, inverter 279 may convert AC power from ISG 240 into DC power for storing in electric energy storage device 275. Inverter 279 may be controlled via electric machine controller 252. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of power that is directly delivered to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches 211 and forward clutch 210 for selectively engaging and disengaging forward gears 213 (e.g., gears 1-10) and reverse gear 214. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand power or power request from an accelerator pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

In response to a request to decelerate vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 275, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG 240 as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-X (where X is an upper gear number), D (drive), neutral (N), and P (park). Shift selector 290 shift lever 293 may be prevented from moving via a solenoid actuator 291 that selectively prevents shift lever 293 from moving from park or neutral into reverse or a forward gear position (e.g., drive).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a vehicle system, comprising: an engine; a driveline disconnect clutch coupled to the engine; an electric machine coupled to the driveline disconnect clutch; a transmission including a plurality of gear clutches and gears; and one or more controllers including executable instructions stored in non-transitory memory to accelerate the engine to an expected speed of an input shaft of the transmission, and additional executable instructions to fully close an on-coming clutch of the transmission in response to the engine being within a threshold speed of the expected speed of the input shaft of the transmission. The vehicle system includes where the expected speed of the input shaft is a speed of the input shaft immediately following a power-on downshift of the transmission. The vehicle system includes where the power-on downshift is complete when an on-coming clutch of the transmission is fully closed. The vehicle system further comprises additional instructions to fully open an off-going clutch in response to a request for a power-on downshift of the transmission. The vehicle system includes where the engine is accelerated to the expected speed of the input shaft of the transmission in response to the request for the power-on downshift. The vehicle system includes where fully closing the on-coming clutch completes a power-on downshift of the transmission. The vehicle system further comprises additional instructions to fully close the driveline disconnect clutch before fully closing the on-coming clutch.

Referring now to FIG. 3, a prophetic vehicle operating sequence according to the method of FIGS. 4 and 5 is shown. The vehicle operating sequence of FIG. 3 may be provided via the system of FIGS. 1 and 2 in cooperation with the method of FIGS. 4 and 5. The plots shown in FIG. 3 are time aligned and occur at the same time. The vertical lines at t0-t7 represent times of interest during the sequence.

The first plot from the top of FIG. 3 is a plot of accelerator pedal position versus time. The vertical axis represents the accelerator pedal position and the accelerator pedal position increases in the direction of the vertical axis arrow. The horizontal axis represents time and time increases from the left side of the figure to the right side of the figure. Trace 302 represents the accelerator pedal position.

The second plot from the top of FIG. 3 is a plot of engaged transmission gear versus time. The vertical axis represents the engaged transmission gear number and the engaged transmission gear numbers are listed along the vertical axis. The horizontal axis represents time and time increases from the left side of the figure to the right side of the figure. Trace 304 represents the engaged transmission gear.

The third plot from the top of FIG. 3 is a plot of electric machine or ISG speed versus time. The vertical axis represents the ISG speed and ISG speed increases in the direction of the vertical axis arrow. The horizontal axis represents time and time increases from the left side of the figure to the right side of the figure. Trace 306 represents the ISG speed (e.g., speed of ISG 240). The fourth plot from the top of FIG. 3 is a plot of engine speed versus time. The vertical axis represents engine speed and engine speed increases in the direction of the vertical axis arrow. The horizontal axis represents time and time increases from the left side of the figure to the right side of the figure. Trace 308 represents the engine speed.

The fifth plot from the top of FIG. 3 is a plot of driveline disconnect clutch state versus time. The vertical axis represents the driveline disconnect clutch state and the driveline disconnect clutch is fully closed and able to transfer torque when trace 310 is near the vertical axis arrow. The driveline disconnect clutch is fully open and unable to transfer torque when trace 310 is at a lower level near the horizontal axis. Trace 310 represents the driveline disconnect clutch state.

The sixth plot from the top of FIG. 3 is a plot of first gear clutch state versus time. The vertical axis represents the first gear clutch state and the first gear clutch is fully closed and able to transfer torque when trace 312 is near the vertical axis arrow. The first gear clutch is fully open and unable to transfer torque when trace 312 is at a lower level near the horizontal axis. Trace 312 represents the second gear clutch state.

The seventh plot from the top of FIG. 3 is a plot of second gear clutch state versus time. The vertical axis represents the second gear clutch state and the second gear clutch is fully closed and able to transfer torque when trace 314 is near the vertical axis arrow. The second gear clutch is fully open and unable to transfer torque when trace 314 is at a lower level near the horizontal axis. Trace 314 represents the second gear clutch state.

The eighth plot from the top of FIG. 3 is a plot of third gear clutch state versus time. The vertical axis represents the third gear clutch state and the driveline disconnect clutch is fully closed and able to transfer torque when trace 316 is near the vertical axis arrow. The third gear clutch is fully open and unable to transfer torque when trace 316 is at a lower level near the horizontal axis. Trace 316 represents the third gear clutch state.

At time t0, the accelerator pedal is applied a small amount and the transmission is engaged in second gear. The ISG speed is at a lower level and the engine is stopped (e.g., not rotating and not combusting fuel). The driveline disconnect clutch is fully open and the second gear clutch is fully closed. The first and third gear clutches are fully opened.

Between time t0 and time t1, the vehicle's driver (not shown) applies the accelerator pedal and the transmission remains in second gear. The ISG speed increases and the engine remains stopped. The driveline disconnect clutch remains fully open and the second gear clutch remains fully closed. The first and third gear clutches remain fully open.

At time t1, an upshift from second gear to third gear is requested in response to vehicle speed and accelerator pedal position. The second gear clutch (e.g., the off-going clutch)

begins to open. While the second gear clutch is being opened, the third gear clutch (e.g., the on-coming clutch) is being closed. The second gear clutch is fully open and the third gear clutch is fully closed before time t2. The first gear clutch remains fully open. The driveline disconnect clutch remains fully open while the third gear clutch is closing. The driveline disconnect clutch begins to close and transfer torque to the engine in response to the third gear clutch fully closing. Alternatively, the driveline disconnect clutch may begin to close before the on-coming clutch is fully closed. The speed of the ISG and the transmission input shaft speed, which are a same speed when the torque converter clutch is locked, begin to be reduced so that the ISG speed will match the expected speed of the transmission input shaft when the on-coming clutch is fully closed. This may reduce slip of the on-coming clutch when the on-coming clutch is closed. The engine speed begins to increase after time t1 as the driveline disconnect clutch begins to close. The torque capacity of the driveline disconnect clutch may be adjusted to a level that is sufficient to rotate the engine at cranking speed (e.g., 200 RPM). The torque capacity of the driveline disconnect clutch is also below the torque capacity of the electric machine or ISG.

At time t2, the engine is started and the engine has been accelerated to the speed of the electric machine or ISG. The engine may be accelerated under power of the engine and via torque that is transferred from the electric machine or ISG to the engine via the driveline disconnect clutch. The driveline disconnect clutch is fully closed in response to the engine speed being equal to the electric machine or ISG speed. Fully closing the driveline disconnect clutch when engine speed is equal to electric machine or ISG speed may reduce driveline torque disturbances. The engine speed and electric machine or ISG speed are equal and they begin to accelerate since the accelerator pedal position continues to increase. The transmission is engaged in third gear and the third gear clutch remains fully closed. The first and second gear clutches are fully open.

Between time t2 and time t3, the accelerator pedal position continues to increase, but near time t3, the accelerator pedal is fully released. The transmission remains in third gear and the ISG and the engine accelerate. The driveline disconnect clutch remains fully closed and third gear remains engaged. The second gear clutch is fully open and the third gear clutch is fully closed. The first gear clutch is also fully open.

At time t3, a power-off transmission downshift (e.g., a transmission gear shift to a lower gear while the accelerator pedal is released) is requested. The third gear clutch (e.g., off-going clutch) begins to be released or opened. Shortly after time t3, the second gear clutch (e.g., the on-coming clutch) begins to be applied or closed. The driveline disconnect clutch remains fully closed at time t3 and the first gear clutch is fully open.

Between time t3 and time t4, the third gear clutch is fully released and the second gear clutch is fully closed to shift the transmission into second gear. Shifting the transmission into second gear accelerates the engine and the ISG, but then the engine speed and ISG speed decline shortly after second gear is engaged since the accelerator pedal is not applied. The driveline disconnect clutch remains fully closed and first gear clutch remains fully open.

At time t4, the driveline disconnect clutch is fully opened in response to the accelerator pedal position and vehicle speed (not shown). The accelerator pedal is not applied and the transmission is engaged in second gear. The engine is stopped (e.g., not rotating and not combusting fuel) shortly after the driveline disconnect clutch is fully opened at time t4. The third gear clutch is fully open and electric machine or ISG speed continues to decline. The first gear clutch is fully open.

Between time t4 and time t5, the ISG speed continues to decline and the engine is stopped. The accelerator pedal is not applied until shortly before time t5, then the accelerator pedal is applied at a higher rate near time t5. The transmission is engaged in second gear and the driveline disconnect clutch is fully open. The second gear clutch is fully closed and the third gear clutch is fully open. The first gear clutch is fully open.

At time t5, a power-on downshift (e.g., a transmission gear shift to a lower gear while the accelerator pedal is applied) is requested in response to accelerator pedal position and vehicle speed. The second gear (off-going clutch) begins to be opened and the third gear clutch is fully open. The driveline disconnect clutch is fully open and first gear clutch is fully open.

At time t6, the second gear clutch is fully open and the transmission enters neutral. The driveline disconnect clutch is fully closed while the transmission is engaged in neutral. The driveline disconnect clutch may begin closing while the off-going clutch is being released or in response to the off-going clutch being fully released. The driveline disconnect clutch may be fully closed before the on-coming clutch of the gear being engaged (e.g., first gear) begins to close. The ISG speed begins to be increased to an expected transmission input shaft speed that will be present after the requested downshift is complete. In one example, the expected transmission input shaft speed is the vehicle wheel speed divided by the ratio of the gear being engaged in the downshift and other intervening gear ratios (e.g., the axle gear ratio) to determine the expected transmission input shaft speed. The ISG accelerates the engine to the expected speed of the transmission input shaft speed so that when the on-coming clutch is closed, the on-coming clutch slip may be reduced to reduce the possibility of clutch wear. The engine is started (e.g., the engine provided positive torque to the driveline and rotates while combusting fuel) as the electric machine or ISG and engine accelerate to the expected speed of the transmission input shaft.

At time t7, the engine speed and ISG speed is equal to the expected transmission input shaft speed so the on-coming clutch (e.g., first gear clutch) begins to close. The on-coming clutch may be closed when the engine and ISG speed are equal to the expected transmission input shaft speed immediately after the power-on down shift so that driveline torque disturbances and clutch wear may be reduced. The accelerator pedal position continues to increase and the transmission is engaged in first gear shortly after time t7. The ISG speed and engine speed are at the expected transmission input shaft speed. The driveline disconnect clutch remains fully closed and second and third gear clutches are fully open.

In this way, transmission gear shifts may be performed according to different sequences. In particular, during a power-on downshift, the on-coming gear clutch may be closed after the driveline disconnect clutch is closed so that the engine may be accelerated quickly to the expected transmission input shaft speed that immediately follows the downshift. Consequently, the gear shift time may be reduced and driveline torque disturbances may be mitigated. On the other hand, during transmission upshifts or less urgent transmission downshifts, the on-coming clutch may be closed before the driveline disconnect clutch is closed so that a smooth engine start and gear shift may be provided.

Referring now to FIGS. 4 and 5, a flowchart 400 of a method for operating a vehicle is shown. At least portions of method 400 may be implemented as executable controller instructions stored in non-transitory memory. Method 400 may operate in cooperation with the system of FIGS. 1 and 2. Additionally, portions of method 400 may be actions taken in the physical world to transform an operating state of an actuator or device. The method of FIGS. 4 and 5 may be incorporated into the system of FIGS. 1 and 2 as executable instructions stored in non-transitory memory. Method 400 may be performed when an electric machine is providing torque to a driveline to propel a vehicle or to slow a vehicle while the vehicle is traveling on a road and the engine is stopped. The electric machine torque applied to propel the vehicle may be determined or based on an accelerator pedal position.

At 402, method 400 judges if the engine is stopped (e.g., not rotating and not combusting fuel) and an engine start is requested. In one example, method 400 may request an engine start if a driver demand power or torque is greater than a threshold power or torque. Alternatively, method 400 may request an engine start when an electric energy storage device state of charge is less than a threshold state of charge. If method 400 judges that the engine is stopped and an engine start is requested, the answer is yes and method 400 proceeds to 404. Otherwise, the answer is no and method 400 proceeds to 440.

At 440, method 400 continues to operate the engine and the electric machine (e.g., ISG 240) in their present mode. For example, if the engine is stopped and the electric machine is providing torque to the driveline, then the engine remains stopped and the electric machine continues to provide torque to the driveline. Further, method 400 may automatically stop the engine when driver demand torque is less than a threshold. Method 400 proceeds to exit.

At 404, method 400 judges if a power-on downshift is requested. A power-on downshift may be requested in response to an increasing accelerator pedal position and a transmission shift schedule that indicates that the transmission may be downshifted at the present vehicle speed. The transmission shift schedule may indicate which gear is to be engaged in response to present vehicle conditions (e.g., accelerator pedal position or driver demand torque/power and vehicle speed). In one example, the transmission shift schedule outputs a requested transmission gear according to the present vehicle speed and driver demand power or torque. If the vehicle's presently engaged gear is a higher gear than the requested transmission gear and if the accelerator pedal is applied, then the answer is yes and method 400 proceeds to 406. Otherwise, the answer is no and method 400 proceeds to 450.

At 450, method 400 begins a transmission gear shift if a gear shift is requested via the transmission shift schedule and vehicle operating conditions (e.g., vehicle speed and driver demand torque or power). The transmission gear shift begins via opening the off-going clutch of the presently engaged transmission gear and beginning to close the on-coming clutch of the requested transmission gear. The off-going clutch may be completely opened and the on-coming clutch may be completely closed before beginning to close the driveline disconnect clutch so that the driveline disconnect clutch may be fully closed when engine speed is equal to the transmission input shaft speed immediately following the transmission gear shift. Method 400 proceeds to 452.

At 452, method 400 applies a torque reserve to the driveline to start the engine via the electric machine (e.g., ISG 240). A torque reserve for engine starting via an electric machine (e.g., ISG 240) is an amount or portion of the electric machine's torque capacity that is reserved for engine starting when an engine is stopped (e.g., not rotating and not combusting fuel). The electric machine has a total positive torque capacity to add torque to a driveline and a total negative torque capacity to absorb or remove torque from the driveline. For example, an electric machine may have a total positive torque capacity of 200 Newton-meters (Nm) and the electric machine may rotate an engine at cranking speed using 40 Nm of the electric machine's torque capacity. Thus, 40 Nm of the electric machine's torque capacity may be reserved to start the engine (e.g., the electric machine's torque reserve) and a portion of, or the remaining 160 Nm of the electric machine's total torque capacity may be applied to the driveline to propel the vehicle. Method 400 increases the output torque or power of the electric machine by the electric machine torque reserve amount to crank the engine and method 400 proceeds to 452.

At 452, method 400 increases the torque capacity of the driveline disconnect clutch (e.g., an amount of torque the driveline disconnect clutch may transfer when a given pressure is applied to the driveline disconnect clutch) to the torque reserve amount of the electric machine or an amount of torque needed to rotate the engine at engine cranking speed. Thus, the torque capacity of the driveline disconnect clutch is less than the total torque capacity of the electric machine so that all of the electric machine's torque is not delivered to the engine. Method increases the torque capacity of the driveline disconnect clutch, thereby rotating the engine via the driveline disconnect clutch and the electric machine. Method 400 proceeds to 454.

At 456, method supplies fuel and spark to engine cylinders to start the engine. In addition, method 400 accelerates the engine to a speed of the electric machine and fully closes the driveline disconnect clutch in response to the speed of the engine being equal to the speed of the electric machine after the engine is started. This may reduce a driveline torque disturbance that may be caused via closing the driveline disconnect clutch. The driveline disconnect clutch is fully closed after the on-coming clutch of the requested gear is fully closed so that slip of the driveline disconnect clutch may be reduced and so that driveline torque disturbances may be reduced. Method 400 proceeds to exit.

At 406, method 400 judges if a fast disconnect clutch apply procedure is supported by the vehicle. In one example, a fast disconnect clutch apply procedure may be supported when a temperature of the vehicle (e.g., driveline disconnect clutch temperature, engine temperature, electric machine temperature, or electric energy storage device temperature) is greater than a threshold temperature. In addition, method 400 may require that other vehicle operating conditions be met to perform a fast disconnect clutch apply procedure. If method 400 judges that a fast disconnect clutch apply procedure is supported, the answer is yes and method 400 proceeds to 408. Otherwise, the answer is no and method 400 proceeds to 430.

At 408, method 400 judges if a high urgency engine start is requested. A high urgency engine start may be requested when driver demand torque or power is greater than a threshold and when a rate of change in the driver demand torque or power exceeds a threshold level. Further, method 400 may judge that a high urgency engine start is requested during conditions of degraded driveline components (e.g., when a battery ceases accepting charge or when an inverter is not performing as expected) when an emergency vehicle is in the vicinity of the vehicle. If method 400 judges that a high urgency engine start is requested, the answer is yes and method 400 proceeds to 410. Otherwise, the answer is no and method 400 proceeds to 430.

At 410, method 400 judges if a transmission controller or an alternative controller (e.g., a VSC) is indicating an attempted fast driveline disconnect clutch apply. Method 400 may judge that a fast driveline disconnect clutch apply is being attempted when a rate of pressure applied to the driveline disconnect clutch is greater than a threshold amount or when to a value of a variable stored in controller memory is a particular value (e.g., a logical 1). If method 400 judges that a fast driveline disconnect clutch apply is being attempted, the answer is yes and method 400 proceeds to 412. Otherwise, the answer is no and method 400 proceeds to 430.

At 412, method 400 limits reserve torque or power of the electric machine so that the electric machine may provide greater amounts of power or torque to the driveline as compared to if the reserve torque was not available to apply to the vehicle driveline. For example, a torque reserve of the electric machine for engine starting may generally be 40 Nm. However, the torque reserve for engine starting may be reduced to 5 Nm so that the electric machine may provide more of the requested driver demand torque or power to the vehicle driveline. Method 400 also fully opens the off-going transmission clutch without beginning to close the on-coming clutch so that the transmission is in a neutral state where torque may not be transmitted between the transmission's input shaft and the transmission's output shaft. Alternatively, the off-going clutch may be partially opened and the on-coming clutch may be partially closed so that less than a threshold amount of torque (e.g., less than 10% of the transmission's torque capacity) may be transferred through the transmission. Method 400 proceeds to 414.

At 414, method 400 judges if the electric machine controller, VSC, or other controller is indicating isolation of the driveline torque sources from the vehicle's wheels. Method 400 may indicate that driveline torque sources are isolated from the vehicle's wheels when the transmission is in neutral. If method judges that the driveline torque sources have been isolated, the answer is yes and method 400 proceeds to 416. Otherwise, the answer is no and method 400 proceeds to 430.

At 416, method 400 judges if a fast driveline disconnect clutch apply may be permitted. Method 400 may judge that a fast driveline disconnect clutch apply may be permitted if the driveline disconnect clutch is not degraded. The driveline disconnect clutch may be determined to be degraded if the driveline disconnect clutch's torque capacity has been reduced to less than a threshold torque capacity. The driveline's torque capacity may be estimated via applying an increasing pressure to close the driveline disconnect clutch and determining an amount of torque that is transmitted via the driveline disconnect clutch via a torque sensor or via the electric machine. If method 400 judges that a fast driveline disconnect clutch application is permitted, the answer is yes and method 400 proceeds to 418. Otherwise, the answer is no and method 400 proceeds to 430.

At 418, method 400 requests a large torque from the electric machine (e.g., ISG 240) to assist engine starting. Method 400 may request up to the total torque capacity of the electric machine to accelerate the engine. Method 400 also begins closing the driveline disconnect clutch. The driveline disconnect clutch torque capacity may be increased at a predetermined rate. Method 400 proceeds to 420.

At 420, method 400 starts the engine via supplying spark and fuel to the engine while the engine is being accelerated via closing the driveline disconnect clutch and rotating the engine via the electric machine. Method 400 accelerates the engine to an expected speed of an input shaft of the transmission immediately after the downshift is completed. For example, if wheel speed is rotating at X RPM, then the expected input shaft speed of the transmission immediately following the downshift may be determined via dividing the wheel speed via the gear ratio of the gear being engaged in the present transmission downshift and the ratio of any other intervening gears between the wheels and the transmission input shaft (e.g., the axle ratio). The torque converter clutch may be locked during the engine starting process. By accelerating the engine speed to the transmission input shaft speed, it may be possible to reduce the possibility or magnitude of driveline torque disturbances. The driveline disconnect clutch may be fully closed in response to the engine speed being equal to the transmission input shaft speed. Alternatively, the engine may be accelerated to the speed of the electric machine via fully closing the driveline disconnect clutch. Method 400 proceeds to 422.

At 422, method 400 completes the downshift if the transmission via fully closing the on-coming clutch of the gear that is being engaged. By closing the on-coming clutch after the driveline disconnect clutch is closed, it may be possible to reduce a magnitude of driveline torque disturbances and/or reduce driveline torque disturbances. Method 400 proceeds to exit.

At 430, method 400 applies the electric machine's allocated torque reserve for engine starting to the driveline. The engine's allocated torque reserve for engine starting is applied to the driveline along with any other electric machine torque that is provided to the driveline for meeting driver demand torque or power. Thus, if driver demand torque is 50 Nm and the torque reserve for engine starting is 40 Nm, then the electric machine provides 90 Nm of positive torque to the driveline. Method 400 proceeds to 432.

At 432, method 400 partially closes the driveline disconnect clutch to increase the driveline disconnect clutch's torque capacity to the torque reserve amount of the electric machine (e.g., 40 Nm in one example). The engine begins to rotate as electric machine torque is transferred to the engine through the driveline disconnect clutch. Method 400 proceeds to 434.

At 434, method 400 starts the engine via supplying spark and fuel to the engine. Method 400 also downshifts the transmission via opening the off-going clutch and closing the on-coming clutch. The engine is accelerated to the speed of the electric machine under the engine's power and under the electric machine's reserve torque. Method 400 proceeds to 436.

At 436, method 400 fully closes the driveline disconnect clutch when the engine speed is equal to the electric machine speed. The driveline disconnect clutch is closed after the downshift is completed (e.g., after the on-coming clutch is fully closed). Closing the driveline disconnect clutch when engine speed is equal to electric machine speed may reduce driveline torque disturbances and closing the driveline disconnect clutch after the on-coming clutch is fully closed may prevent the electric machine torque from declining during closing of the driveline disconnect clutch. Method 400 proceeds to exit.

In this way, closing of the driveline disconnect clutches and the gear clutches may be adjusted to reduce an amount of time it takes to perform a driveline mode change when engine power is deemed to be urgently requested. Further, closing of the driveline disconnect clutches and the gear clutches may be adjusted to smooth driveline mode changes when engine power is deemed not to be urgently requested.

Thus, the method of FIGS. 4 and 5 provides for a vehicle operating method, comprising: stopping rotation of an engine via a controller in response to vehicle operating conditions; and in response to request for a power-on downshift of a transmission, shifting the transmission to neutral and rotating the engine via an integrated starter/generator to an expected input shaft speed of the transmission, the expected input shaft speed of the transmission occurring immediately after the power-on downshift of the transmission. The method further comprises shifting the transmission to a lower gear in response to the engine being at the expected input shaft speed of the transmission. The method further comprises starting the engine while accelerating the engine to the expected input shaft speed of the transmission. The method includes where the expected input shaft speed of the transmission is greater than a speed of an input shaft speed of the transmission immediately before the request for the power-on upshift. The method further comprises closing a driveline disconnect clutch in response to the request for the power-on downshift. The method includes where closing the driveline disconnect clutch includes closing the driveline disconnect clutch at a first rate when engine starting is determined to be urgent. The method further comprises closing the driveline disconnect clutch at a second rate in absence of the request for the power-on downshift of the transmission, where the second rate is slower than the first rate. The method further comprises propelling a vehicle via the integrated starter/generator immediately before the request for the power-on downshift.

The method of FIGS. 4 and 5 also provides for a vehicle operating method, comprising: starting an engine via a controller during a first transmission gear shift or after a request for the first transmission gear shift via partially closing a driveline disconnect clutch before fully closing an on-coming clutch of the first transmission gear shift; and starting an engine during a second transmission gear shift or after a request for the second transmission gear shift via fully closing a driveline disconnect clutch before fully closing an on-coming clutch of the second transmission gear shift. The method further comprises fully closing the driveline disconnect clutch after fully closing the on-coming clutch of the first transmission gear shift. The method includes where the on-coming clutch of the second transmission gear shift is fully closed in response to a speed of the engine reaching an expected speed of a transmission input shaft. The method includes where the expected speed of the transmission input shaft is a speed of a transmission input shaft immediately following a power-on downshift of a transmission. The method includes where the power-on downshift ends when an on-coming clutch of the power-on downshift fully closes.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A vehicle operating method, comprising:
   stopping rotation of an engine via a controller in response to vehicle operating conditions; and
   in response to request for a power-on downshift of a transmission, shifting the transmission to neutral and rotating the engine via an integrated starter/generator.

2. The method of claim 1, where the engine is rotated to an expected input shaft speed of the transmission, wherein the expected input shaft speed of the transmission occurs immediately after the power-on downshift of the transmission is complete, and further comprising:
   shifting the transmission to a lower gear in response to the engine being at the expected input shaft speed of the transmission.

3. The method of claim 2, further comprising starting the engine while accelerating the engine to the expected input shaft speed of the transmission.

4. The method of claim 2, where the expected input shaft speed of the transmission is greater than a speed of an input shaft speed of the transmission immediately before the request for the power-on downshift.

5. The method of claim 1, further comprising closing a driveline disconnect clutch in response to the request for the power-on downshift.

6. The method of claim 5, where closing the driveline disconnect clutch includes closing the driveline disconnect clutch at a first rate when engine starting is determined to be urgent.

7. The method of claim 6, further comprising closing the driveline disconnect clutch at a second rate in absence of the request for the power-on downshift of the transmission, where the second rate is slower than the first rate.

8. The method as claimed in claim 1, further comprising propelling a vehicle via the integrated starter/generator immediately before the request for the power- on downshift.

9. A vehicle system, comprising:
   an engine;
   a driveline disconnect clutch coupled to the engine;
   an electric machine coupled to the driveline disconnect clutch;
   a transmission including a plurality of gear clutches and gears; and
   one or more controllers including executable instructions stored in non-transitory memory to accelerate the engine to an expected speed of an input shaft of the transmission, and additional executable instructions to fully close an on-coming clutch of the transmission in response to the engine being within a threshold speed of the expected speed of the input shaft of the transmission.

10. The vehicle system of claim 9, where the expected speed of the input shaft is a speed of the input shaft immediately following a power-on downshift of the transmission.

11. The vehicle system of claim 10, where the power-on downshift is complete when an on-coming clutch of the transmission is fully closed.

12. The vehicle system of claim 9, further comprising additional instructions to fully open an off-going clutch in response to a request for a power-on downshift of the transmission.

13. The vehicle system of claim 12, where the engine is accelerated to the expected speed of the input shaft of the transmission in response to the request for the power-on downshift.

14. The vehicle system of claim 9, where fully closing the on-coming clutch completes a power-on downshift of the transmission.

15. The vehicle system of claim 9, further comprising additional instructions to fully close the driveline disconnect clutch before fully closing the on-coming clutch.

16. A vehicle operating method, comprising:
starting an engine via a controller during a first transmission gear shift via partially closing a driveline disconnect clutch before fully closing a first transmission gear shift on-coming clutch; and
starting an engine during a second transmission gear shift via fully closing a driveline disconnect clutch before fully closing a second transmission gear shift on-coming clutch.

17. The method of claim 16, further comprising fully closing the driveline disconnect clutch after fully closing the first transmission gear shift on-coming clutch.

18. The method of claim 16, where the second transmission gear shift on-coming clutch is fully closed in response to a speed of the engine reaching an expected speed of a transmission input shaft.

19. The method of claim 18, where the expected speed of the transmission input shaft is a speed of a transmission input shaft immediately following a power-on downshift of a transmission.

20. The method of claim 19, where the power-on downshift ends when the first transmission gear shift on-coming clutch of the power-on downshift fully closes.

* * * * *